(No Model.)

J. LIEFBROER & J. TENDOLLEN.
TIRE HEATER.

No. 526,977. Patented Oct. 2, 1894.

Witnesses
Geo. W. Young.
N. E. Oliphant.

Inventors:
John Liefbroer
John Tendollen.
By H. G. Underwood
Attorney

UNITED STATES PATENT OFFICE.

JOHN LIEFBROER AND JOHN TENDOLLEN, OF OOSTBURG, WISCONSIN.

TIRE-HEATER.

SPECIFICATION forming part of Letters Patent No. 526,977, dated October 2, 1894.

Application filed October 27, 1893. Serial No. 489,296. (No model.)

*To all whom it may concern:*

Be it known that we, JOHN LIEFBROER and JOHN TENDOLLEN, citizens of the United States, and residents of Oostburg, in the county of Sheboygan, and in the State of Wisconsin, have invented certain new and useful Improvements in Tire-Heaters; and we do hereby declare that the following is a full, clear, and exact description thereof.
Our invention has for its object to provide a simple, economical heater in which to expand metal tires preparatory to shrinking the same onto wooden wheels; and it consists in certain peculiarities of construction and combination of parts hereinafter specified with reference to the accompanying drawings and subsequently claimed.

Figure 1:
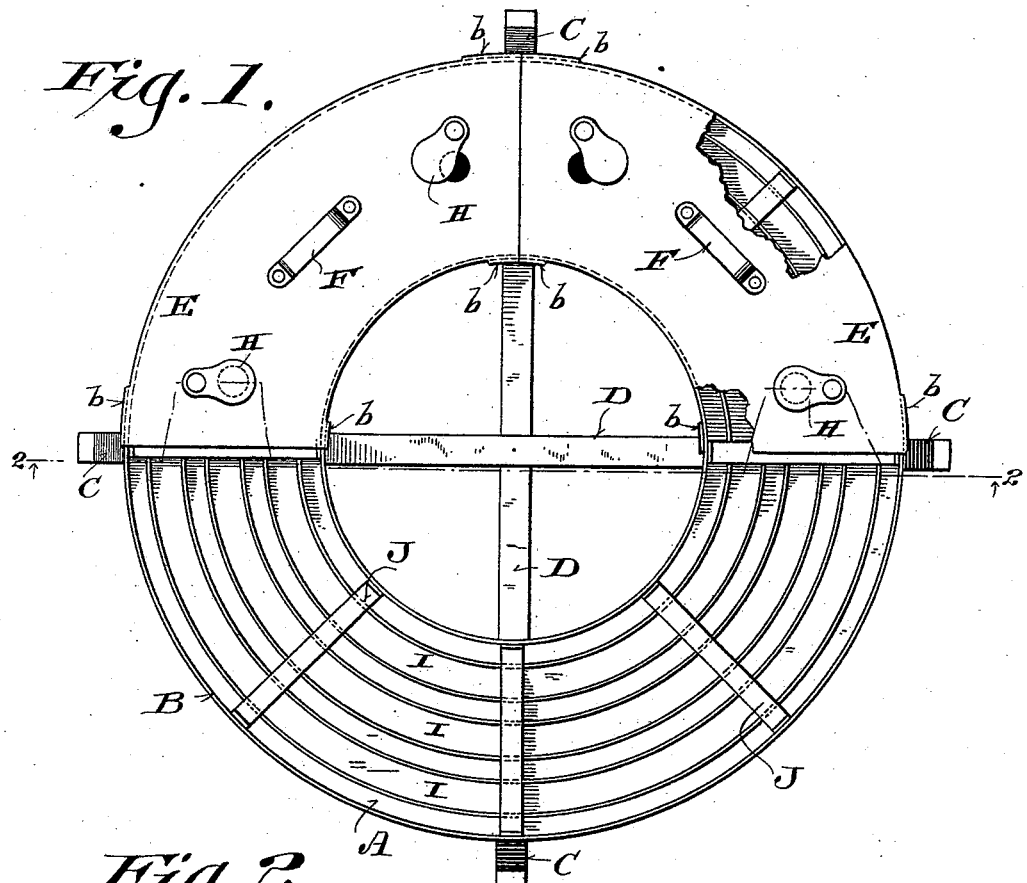
Figure 2:
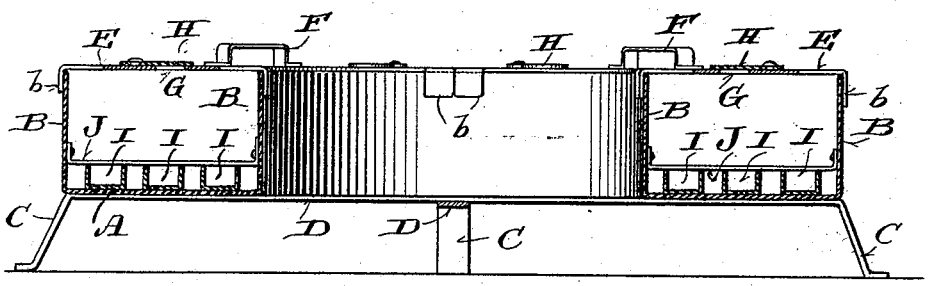

In the drawings: Figure 1 represents a plan view of our tire heater partly broken away and having cover-sections thereof removed. Fig. 2 represents a vertical transverse section of the heater taken on line 2—2 of the preceding figure.

Referring by letter to the drawings, A represents a horizontal base in the form of a circular plate having a round central opening, this base being sheet-metal or other suitable fire-proof material. Rising from the inner and outer edges of the plate are concentric vertical walls B of suitable fire-proof material and the shell thus formed is supported on legs C of any desirable elevation, the legs herein shown being turned down extremities of metal-bars D crossed on each other and made fast to the under side of the shell-base by any suitable means. The fire-proof shell is provided with detachable cover sections E having handles F and draft openings G, the latter being controlled by dampers H pivoted to said cover sections. The shell cover is made in sections as a matter of convenience and as a further convenience each of said sections has a surface equal to one-quarter of the area to be covered. Each cover section has its curved edges provided with depending ears *b* that come outside the shell walls to hold said cover section against lateral displacement.

Arranged on the base A within the above described fire-proof shell are a series of concentric circular gutters I at suitable intervals apart, these gutters being preferably of cast iron, and held in place by means of radial bars J in direct contact with their upper edges, these bars being bolted to the shell-walls or otherwise held in place. The gutters I are designed for the reception of gasoline or other inflammable fluid, controlled as to combustion by the disposition of the dampers H above specified, said fluid being employed as fuel wherewith to heat a tire or tires confined within the covered shell herein set forth.

In practice a tire is laid on the radial bars within the shell, the latter covered, the dampers adjusted to regulate draft and the inflammable fluid ignited, it being preferable to place this fluid in the gutter having a diameter approximating to that of said tire.

From the foregoing it will be seen that a tire may be equally heated at all points of its circumference in a very short time with but little expenditure of fuel.

It is a matter of vital importance that the stay-bars which form the tire-supports should be, as stated, in direct contact with the upper edges of the described gutters, this being necessary to insure a rapid and even expansion of the tires placed thereon, in addition to the described function of said stay-bars in holding the gutters in place.

Having now described our invention, what we claim as new, and desire to secure by Letters Patent, is—

1. A tire-heater comprising a fire-proof shell having a cover provided with draft-openings, a series of concentric gutters arranged on the bottom of the shell, and a series of radial stay-bars in direct contact with the upper edges of the said gutters, at suitable intervals, substantially as set forth.

2. A tire-heater comprising a fire-proof shell in the form of a horizontal plate having a round central opening, and vertical walls rising from the inner and outer edges of the plate, cover-sections for the shell having damper controlled draft-openings, gutters concentrically arranged on the bottom of the shell within the same, and tire-supports in the form of radial stay-bars in direct contact with the upper edges of the said gutters, at suitable intervals, substantially as set forth.

3. A tire-heater comprising a fire-proof shell in the form of a horizontal plate having a round central opening, and vertical walls rising from the inner and outer edges of said plate, detachable cover-sections, provided with suitable handles and damper controlled openings, said sections having straight ends and curved edges provided with depending ears, crossed metal bars secured to the under side of the said horizontal plate, and having their extremities turned down to form legs; a series of concentric circular gutters arranged upon the upper side of said plate, for the reception of liquid fuel, and radially disposed stay-bars, in direct contact with the upper edges of said gutters, and secured to said shell, the said stay-bars serving further as supports for the tires to be heated, all combined and adapted to operate as and for the purposes set forth.

In testimony that we claim the foregoing we have hereunto set our hands, at Oostburg, in the county of Sheboygan and State of Wisconsin, in the presence of two witnesses.

JOHN LIEFBROER.
JOHN TENDOLLEN.

Witnesses:
P. J. DAANE,
JOHN THENNE.